United States Patent
Fraccaroli

(10) Patent No.: US 9,264,874 B2
(45) Date of Patent: Feb. 16, 2016

(54) METHOD AND APPARATUS FOR LOCATION BASED NETWORKING SESSIONS

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 335 days.

(21) Appl. No.: 13/633,133

(22) Filed: Oct. 2, 2012

(65) Prior Publication Data

US 2014/0095607 A1    Apr. 3, 2014

(51) Int. Cl.
| | | |
|---|---|---|
| G06F 15/16 | (2006.01) | |
| H04W 4/20 | (2009.01) | |
| G06Q 50/00 | (2012.01) | |
| H04W 4/02 | (2009.01) | |
| G06Q 10/10 | (2012.01) | |
| H04L 29/08 | (2006.01) | |
| H04W 4/08 | (2009.01) | |

(52) U.S. Cl.
CPC .............. *H04W 4/206* (2013.01); *G06Q 10/107* (2013.01); *G06Q 50/01* (2013.01); *H04L 67/14* (2013.01); *H04W 4/021* (2013.01); *H04W 4/08* (2013.01)

(58) Field of Classification Search
CPC ......... H04W 4/02; H04W 4/021; H04W 4/08; H04W 84/18
USPC .............. 455/404.1, 404.2, 414.1–416, 455/456.1–457, 518–520
See application file for complete search history.

(56) References Cited

U.S. PATENT DOCUMENTS

| | | | |
|---|---|---|---|
| 6,061,561 A | 5/2000 | Alanara | |
| 6,539,232 B2 | 3/2003 | Hendrey | |
| 6,542,748 B2 | 4/2003 | Hendrey | |
| 6,542,750 B2 | 4/2003 | Hendrey | |
| 6,647,269 B2 | 11/2003 | Hendrey | |
| 6,774,840 B1 | 8/2004 | Adamczyk | |
| 7,024,195 B2 | 4/2006 | Miriyala | |
| 7,113,797 B2 | 9/2006 | Kelley | |
| 7,203,502 B2 | 4/2007 | Wilson | |
| 7,254,388 B2 | 8/2007 | Nam | |
| 7,328,029 B1 | 2/2008 | Adamczyk | |
| 7,359,724 B2 | 4/2008 | Torvinen | |
| 7,643,834 B2 | 1/2010 | Ioppe | |
| 7,668,537 B2 | 2/2010 | De Vries | |
| 7,813,741 B2 | 10/2010 | Hendrey | |
| 7,848,765 B2 | 12/2010 | Phillips | |
| 7,856,360 B2 | 12/2010 | Kramer | |
| 8,019,692 B2 | 9/2011 | Rosen | |
| 8,126,479 B2 | 2/2012 | Morrison | |
| 8,126,480 B2 | 2/2012 | Morrison | |
| 8,200,248 B2 | 6/2012 | Ioppe | |
| 8,275,361 B2 | 9/2012 | De Vries | |
| 2003/0020623 A1 | 1/2003 | Cao | |
| 2003/0060214 A1 | 3/2003 | Hendrey | |
| 2008/0113674 A1 | 5/2008 | Baig | |
| 2009/0215469 A1 | 8/2009 | Fisher | |

(Continued)

OTHER PUBLICATIONS

US 6,731,928, 05/2004, Tanaka (withdrawn)

*Primary Examiner* — Vladimir Magloire
*Assistant Examiner* — Erica Navar
(74) *Attorney, Agent, or Firm* — Federico Fraccaroli

(57) ABSTRACT

In accordance with one example embodiment of the present invention a method comprises at least partially controlling the functionalities of a session area wherein said session area can be either in an active status or in a passive status according to at least one predetermined time window, said session area defining the boundaries for a location based group session event for members of one or more predetermined groups belonging to one or more social networks.

20 Claims, 9 Drawing Sheets

(56) References Cited

U.S. PATENT DOCUMENTS

| | | |
|---|---|---|
| 2010/0056183 A1 | 3/2010 | Oh |
| 2011/0035445 A1 | 2/2011 | Eickhoff |
| 2012/0064919 A1 | 3/2012 | Purdy |
| 2012/0072340 A1 | 3/2012 | Amron |
| 2013/0012239 A1 | 1/2013 | Crowley et al. |
| 2013/0035114 A1* | 2/2013 | Holden et al. ............ 455/456.3 |
| 2013/0059606 A1 | 3/2013 | Pujol |
| 2013/0122936 A1 | 5/2013 | Hudson |
| 2013/0316735 A1 | 11/2013 | Li |
| 2014/0045472 A1 | 2/2014 | Sharma et al. |
| 2014/0095296 A1 | 4/2014 | Angell et al. |
| 2014/0099973 A1 | 4/2014 | Cecchini |
| 2014/0162693 A1 | 6/2014 | Wachter et al. |
| 2014/0162698 A1 | 6/2014 | Han |
| 2014/0316897 A1 | 10/2014 | Montanaro |

* cited by examiner

Event Planning Data Structure 200

| Event ID | Organizer | Group 1 | Group 2 | Session Zone Radius | Notification Zone Radius / Time | Active Time Window | Recurrence | Parameters | Location |
|---|---|---|---|---|---|---|---|---|---|
| ID 768 | Owner of Cool River — 234 | Dallas IP Lawyers Group (LinkedIN) | Entrepreneur (LinkedIN) | 1000 yds — 233 | 3 Miles / 1 hour in advance of active session. | 4 Pm to 6 Pm | Every Month on 23rd | Maximum Number of Check-ins : 100; — 231 Open Event | Cool River LAT/LONG |
| ID 873 | LinkedIn Group Admin for Real Estate Builders — 242 | Real Estate Builders Group (LinkedIN) | Mortgage Bankers Association (MBA) (LinkedIN) | 500 Yds | 2 Miles / 1 hour in advance of active session | 4 Pm to 6 Pm | Single Event : July 23rd — 243 | Closed to users not belonging to groups; Closed Event — 241 | Romano's Pizza. (Address) |
| ID 902 | Member of Angel Investors Group — 252 | Angel Investors Group (LinkedIN) | On Start Up Group / Entreprenour (LinkedIN) | 1000 Yds | 4 Miles / 3 hours in advance; Stop 1 hour before end of event — 232 | 4 Pm to 6 Pm | Every Friday | Mix<br>• 30% Angels investors<br>• 70% Start Up — 251<br>Closed Event | LAT/LONG |
| ID 828 | First Name Last Name — 261 | Injury Lawyers of Dallas (Meet Up) | Medical Advisors / Expert witnesses (Meet up) | 500 Yds | 4 Miles / 1 hour in advance | 3 Pm to 5 Pm | August 13th 2012 | Stop proximity notifications when Lawyers check-ins are more than 40 — 262 Open Event | LAT/LONG |

METHOD AND APPARATUS FOR LOCATION BASED NETWORKING SESSIONS

TECHNICAL FIELD

The present application generally relates to a location-based networking sessions that can be gated, e.g. accessible only to members of one or more predetermined groups or alternatively satisfying certain conditions, or open to anybody.

BACKGROUND

The teachings of U.S. Pat. No. 6,819,919, U.S. Pat. No. 6,542,750, U.S. Pat. No. 7,813,741, U.S. Pat. No. 6,542,748, U.S. Pat. No. 6,539,232, U.S. Pat. No. 6,542,749, U.S. Pat. No. 8,150,439 and U.S. Pat. No. 6,549,768 are incorporated herein by reference in their entirety. Furthermore, where a definition or use of a term in a document, which is incorporated by reference, is inconsistent or contrary to the definition of that term provided herein, the definition of that term provided herein applies and the definition of that term in the reference does not apply.

A geofence is a virtual perimeter for a real-world geographic area. A geofence can be dynamically generated as in a radius around a point location such as a bar or a restaurant. A geofence can be a predefined set of boundaries connecting points expressed by latitude and longitude. Geofencing has been made possible especially by the introduction of GPS (Global Positioning System) technology and the miniaturization of electronic components that have made the locationing functionality a standard feature in Mobile Phones and portable electronics in general (User Equipment). Geofencing can be implemented via many other localization techniques, both indoor and outdoor.

In some enactments, geofencing is used for security purposes for example to provide security to wireless local area networks. In some other applications, when a location-aware device in a location-based service (LBS) enters or exits a geofence the device may receive a generated warning. Geofencing technology can trigger or inhibit functionalities of location aware apparatuses. For example, as described in U.S. Pat. No. 7,813,741 titled "System and Method for Initiating Responses to Location-Based Events" a system may provide a response to one or more location-based services applications to provide location-based services, such as email, instant messaging, paging and the like.

In other enactments, as described in U.S. Pat. No. 8,150,439 titled "Facilitating user interactions based on proximity" a system is described for providing location-based information and functionalities in various ways. The technique includes enabling multiple people in a common geographic area to interact in various ways, such as via user equipment. In addition, the patent discloses enabling the creation and maintenance of location-based virtual groups of users (also referred to as "clouds"), such as for users of mobile and/or fixed-location devices. Such clouds may enable various types of interactions between group members.

A social network is a social structure made up of a set of actors (such as individuals or organizations) and the ties between these actors. One of means by which these actors can communicate nowadays is the Internet and there are many websites providing a common platform where these actors can interact. A social network provides a way of analyzing the structure of social entities. The study of these structures uses social network analysis to identify local and global patterns, locate influential entities, and examine dynamics.

LinkedIn, for example, is a social networking website for people in professional occupations. It is mainly used for professional networking. One purpose of the site is to allow registered users to maintain a list of contact information of people with whom they have some level of association, called connections. Users can invite anyone (whether a site user or not) to become a connection as long as they possess some data about the targeted connection such as an email address. The contact by a first professional with a second professional within the site often requires either an existing relationship, the sharing of some common traits such as membership to a professional group, or the intervention of another contact related to both professionals. If the invitee rejects the invite, that may count against the inviter. This "gated-access approach" intends to build trust among the service's users.

A list of connections can be used in a number of ways: A contact network is built up consisting of their direct connections, the connections of each of their connections (termed second-degree connections) and also the connections of second-degree connections (termed third-degree connections). This can be used to gain an introduction to someone a person wishes to know through a shared contact. Users can also design their own profile to display work and community experiences. LinkedIn can then be used to find jobs, people and business opportunities recommended by someone in one's contact network. Employers can list jobs and search for potential candidates. Job seekers can review the profile of hiring managers and discover which of their existing contacts can introduce them. Users can post their own photos to support identification and credibility. Users can recommend other users.

A feature of LinkedIn is its groups, enabling anyone to start a group based on an association, interest or industry topic. For example, there are thousands of academic and corporate groups that permit alumni and employees to stay in touch. LinkedIn members request an invitation to the group and can receive postings by other members via e-mail.

LinkedIn is just one of the many different social networks. Many other networks exist targeting different facets of human desire for interaction. To date, some of the most popular are: Badoo, Facebook, Foursquare, Friendster, Google+, Myspace, Habbo, Flixter, Flickr, Douban, Myheritage, Meetup and Classmates.com. Some of these social networks have "group forming" capability among its members.

Groups can also be interacting in real life, not only virtually, behind a keyboard. Meetup.com, for example, is an online social networking portal that facilitates offline group meetings in various localities around the world. It allows members to find and join groups unified by a common interest, such as political views, books, games, movies, fitness, pets, careers or hobbies. Users enter a ZIP code or a city name and the topic they want to meet about; the website helps them arrange a place and time to meet. Topic listings are also accessible to users who only enter a position.

The present invention combines, adapts and adds to some of the above-mentioned concepts, technologies and observations with a synergetic and novel approach.

SUMMARY

Various aspects of examples of the invention are set out in the claims.

According to a first aspect of the present invention, a method comprises at least partially controlling the functionalities of a session area comprising a fixed point, wherein said session area can be in either an active status or in a passive status according to at least one predetermined time window, said session area defining the boundaries for a location based group session event for at least users belonging to at least one predetermined group, wherein said location based group session event can be joined by at least members of said at least one predetermined group via a mobile equipment assisted check-in procedure if said mobile equipment is determined to be positioned within said session area and if said session area is in said active status.

According to a second aspect of the present invention, an apparatus comprises at least one processor; and at least one non-transitory computer-readable medium including a computer program code; the at least one non-transitory computer-readable medium and the computer program code configured to, with the at least one processor, cause the apparatus to perform at least the following:

providing indicia associated with a location based group session event occurring within a session area comprising a fixed point, wherein said session area can be at least either in an active status or in a passive status according to at least one predetermined time window, said session area defining the boundaries for a location based group session event for at least one predetermined group; and enabling a check-in procedure wherein said check-in is conditioned to a location data being comprised within an interval of location data associated with said session area and further conditioned to said session area being in said active status.

According to a third aspect of the present invention, a computer software system has a set of instructions for controlling at least one general-purpose digital computer in performing desired functions comprising a set of instructions formed into each of a plurality of modules, each modules comprising:

a process for at least partially controlling the functionalities of a session area comprising a fixed point, said session area capable of at least being either in an active status or in a passive status according to at least one predetermined time window, wherein said session area is defining the boundaries for a location based group session event for users belonging to at least one predetermined group; and a process for allowing at least members of said at least one predetermined group to join said location based group session event via a mobile equipment assisted check-in procedure if said mobile equipment is positioned within said session area and if said session area is in said active status.

BRIEF DESCRIPTION OF THE DRAWINGS

For a more complete understanding of example embodiments of the present invention, reference is now made to the following descriptions taken in connection with the accompanying drawings in which:

FIG. 2 is a possible embodiment of a datagram storing data pertaining to various events; the person skilled in the art will recognize that to implement certain settings and examples, described in the specification of the present patent application, other memory fields, in addition to the ones described, may be necessary. For example, certain settings and preferences pertinent to a user may call for a user ID and data fields associated to said user ID where said settings and preferences can be stored.

DETAILED DESCRIPTION OF THE DRAWINGS

An example embodiment of the present invention and its potential advantages are understood by referring to FIGS. 1 through 7 of the drawings.

Figure 1:
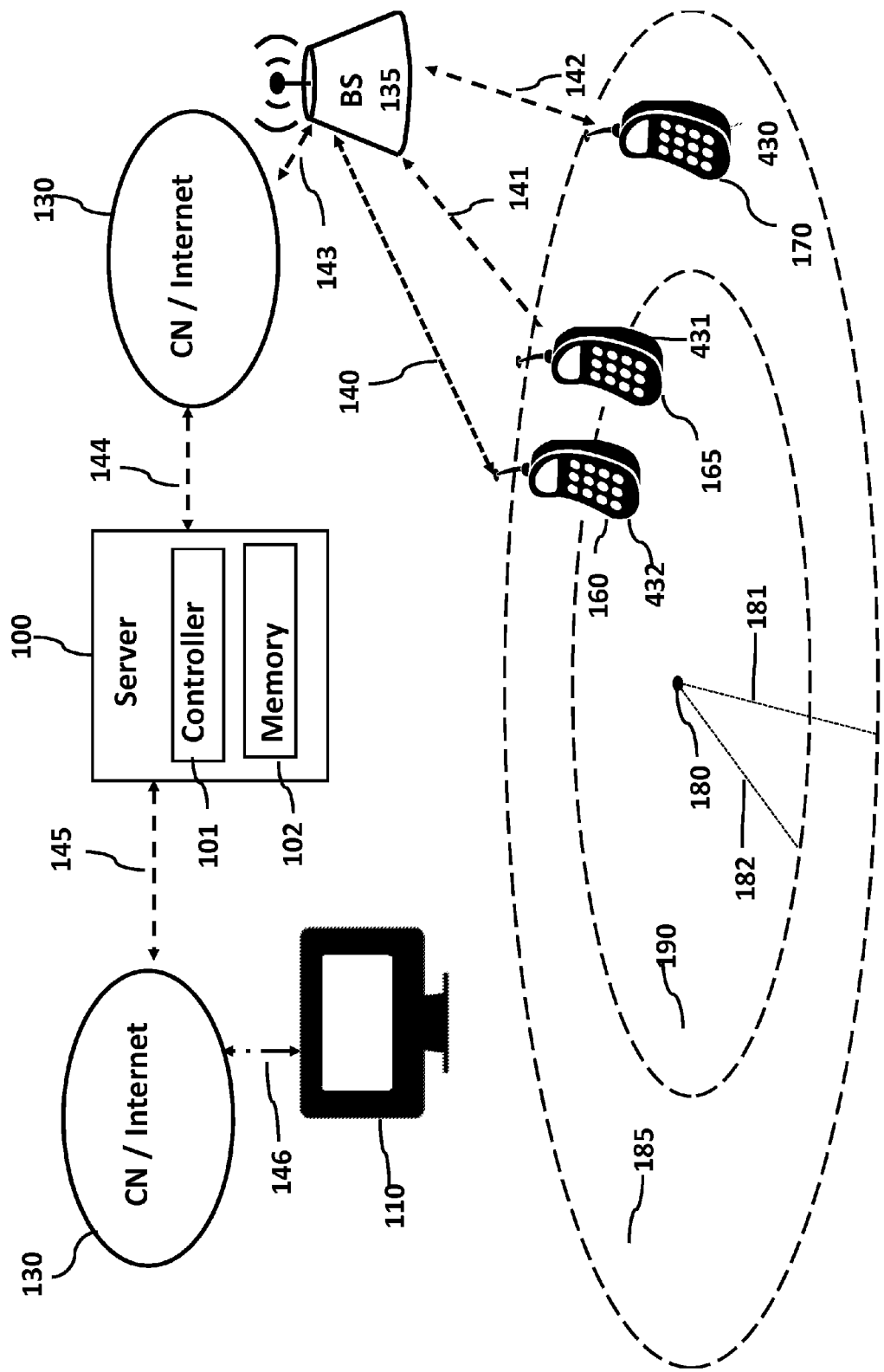
FIG. 1 represents one possible embodiment of the invention in which a plurality of user equipment is located in proximity of an event location.

FIG. 1 describes a possible embodiment of the invention. User Equipment 170 at time T1 is located in Notification Area 185. Because of its location within Notification Area 185 at time T1 and because T1 is comprised within a predefined time window and because User Equipment 170 may contain a software application logged on Memory 430, User Equipment 170 may receive a notification via Radio Link 142 established between User Equipment 170 and Access Point/Base Station (AP/BS) 135 (which for the sake of simplicity, in this example, is serving both Session Area 190 and Notification Area 185).

User Equipment 170 could be a mobile phone, a PDA, a laptop, or a tablet or any other wireless mobile device or wearable equipment as long as capable of connecting with the Internet. Said Notification Area 185 can be an area of circular shape centered on Location 180 and having a Radius 181. Many other possible shapes for the Notification Area 185 are possible. Notification Area 185 may not overlap with Session Area 190 but be the area resulting from carving out Session Area 190 having Radius 182, a circle in this case, from Notification Area 185 having Radius 181, also a circle in this example. The person skilled in the art will realize that many possible alternatives exist to circular shapes and the overlapping of areas. A user in Session Area 190 might find desirable receiving and alert that Session Area 190 has switched into an active status for example. In addition, Notification Area 185 may or may not contain Location 180 which, in this implementation, represents a proxy for a fixed physical location where, for example, members of one or more predefined groups, such as the ones represented in FIG. 1 as carrying User Equipment 170 165 and 160, can choose to physically interact. Said physical location can be e.g., a conference room in a company environment, a public place such as a bar or a private household hosting the event.

Notification Area 185, in one implementation, is an area enclosing and extending beyond Session Area 190. User equipment 170, while positioned within Notification Area 185, can be notified, for example, that a Session Area 190 exists, that it is in proximity, that it is in a certain status, for example that it is in an active status, (or that it will switch to an active status in a period T1,) that it will remain in active status for a residual period T2 or that it will switch to a passive status at time T3. While within Notification Area 185, User Equipment 170 may also be notified of the users who have already checked-in into Session Area 190 such as, for example, the two users in FIG. 1 depicted as carrying User Equipment 160 and 165.

Session Area 190 is represented in FIG. 1 as having a circular shape with Radius 182 and is centered on Location 180. Session Area 190 is an area where mobile equipment such as User Equipment 160 and 165 can check-in (manually or automatically) and be part of a location based group session event if the position of said User Equipment 160 and 165 is determined to be within the boundaries of said Session Area 190 and if said Session Area 190 is set into an active status by the system. Said fixed location point, Location 180, is not to be limited or restricted to a central point or a point of symmetry in a symmetrical geometric figure such as the circles in FIG. 1 representing Session Area 190. Both areas may have an asymmetrical shape as defined by geofencing or other technology.

In some implementations these location based group sessions can be restricted to members of one or more predetermined groups. These groups can be groups that have formed on social networks such as LinkedIn groups, Meetup groups or Facebook groups and are existing before the start of the location based session event. In some implementations, the groups may form just for the purpose of attending a particular session event. In other implementations, some individuals may be given an ad hoc permission to join a specific session event while the session has started and join the "predetermined group". For the purpose of this application the word "group" shall have a general meaning. A group can be the whole body of users of a social network such as LinkedIn or Facebook, or a specific group within one of these social networks whether based on professional associations, social or cultural interests or degrees of separation within the social network. For example, a group can be the body of users who are either in a first or second-degree connection with a determined user.

The advantages of attending a location based session event can be numerous.

As non limiting examples, the check-in may permit the browsing of a list of other users who also have checked-in into the location based session event; it may permit the retrieving of profiles or at least portions of profiles associated with those users who have checked-in; it may also permit the exchanging of files and the sharing of common media being streamed; it may permit the possibility of requesting a face-to-face meeting with other checked-in users or the messaging during or even after the active status has ended according to predetermined settings. Said messaging capability may comprise both "one-to-one" messaging and a chat room type messaging capability.

In one implementation, a log of the people who have checked-in can be stored on User Equipment 160 or on Server 100 and can be retrieved by authorized users for future usage. Authorized users can be, e.g., other members of the groups who were part of the location based group session but did not have a chance to interact with all the members who checked-in during the Time Window 214 allocated to the event.

The person skilled in the art will recognize that many implementations are possible using the different kind of locationing technologies and radio carrier's standards that are available. For example, User Equipment 160, 165 and 170 may be able to communicate with each other and Server 100 via a 3G, 4G or WIMAX technology. This technology is named cellular radio because of the capability to hand-over the radio link from cell to cell (base stations) when user equipment is moving. In this implementation, described in FIG. 1, digital information from and to User Equipment 160, 165 and 170 can be communicated via an Access Point/Base Station (AP/BS) 135 to Server 100 via Links 140, 141, 142, 143, 144 and Core Network/Internet Cloud 130.

Links 143 and 144 can be radio links or any physical means capable of transporting information, including cables. Communications between User Equipment 160 and 165 can occur via a core network infrastructure supporting any of the above-mentioned cellular standards but also can occur using non-cellular standards such as WiFi and Bluetooth technology. For example, User equipment 160 and 165 can use an ad-hoc WiFi connection and communicate directly without the support of a cellular network once a check-in has occurred.

Server 100, which may store a datagram Event Planning Data Structure 200 (to be described in FIG. 2), shall include a Controller 101 capable of comparing information (e.g. a location) received from or associated with mobile equipment such as User Equipment 170, User Equipment 160 or User Equipment 165 with at least some predefined parameters associated with an Event ID 208 (to be described in FIG. 2). Said parameters and conditions can be contained into a datagram such the one that will be described in FIG. 2, the Event Planning Data Structure 200. In one implementation, said datagram can be stored on Server 100 into Memory 102 and user equipment may query said Server 100 every time that data, parameters and conditions need to be retrieved.

In another implementation, at least part of said datagram can be downloaded into user equipment and stored for example into Memory 430, 431 or 432. For example, if the user equipment communicates its position to Server 100 said Server 100 could send the part of the datagram containing data, parameters and conditions related to multiple events associated with the surroundings of said position to the requesting user equipment. In this case, an application and an algorithm stored into Memories 430, 431 or 432 may generate alerts and notifications and permit check-in of surrounding events eliminating the need for continuously pinging Server 100.

Location parameters and conditions can be stored on Memory 102 into an Event Planning Data Structure 200, via Link 145 and Link 146 and Core Network/Internet Cloud 130 by an organizer of the event. Organizer Equipment 110 is depicted in FIG. 1 as fixed equipment such as a desktop computer. The person skilled in the art will recognize that Organizer Equipment 110 is not limited to desktop-type devices but can also be any mobile or wearable device capable of connecting to Server 100 via an Internet connection.

FIG. 1 represents just one of the many possible embodiments of the present invention. In fact, Session Area 190 and Notification Area 185 could overlap or be far away from each other so that a plurality of different access points or base stations (AP/BS) could be needed to serve User Equipment 170, 165 and 160 in the two different areas. Moreover, Session Area 190 and notification Area 185 could be defined not only by means of geofencing but also by many other different techniques. For example, the range of the radio communication link type employed by Access Point/Base Station (AP/BS) 135 could be a way to define a circular area around an Access Point/Base Station (AP/BS) 135. For example, if Access Point/Base Station (AP/BS) 135 was positioned in Location 180, Radius 182 can be the radio horizon of the physical carrier employed by Access Point/Base Station (AP/BS) 135. Said horizon could be defining Notification Area 185 or Session Area 190. The gradient of radio signal strength could be used for defining different and overlapping concentrically situated zones. Furthermore, the radio link employed by Access Point/Base Station (AP/BS) 135 could be of many different types, e.g. Wi-Fi, GSM, WCDMA, LTE, CDMA, RF-ID and Bluetooth, just to cite a few non-limiting examples.

Location can also be provided by many different techniques, for example triangulation with different AP/BS or cell ID or signal strength data from various Access Point/Base Stations 120 coupled with databases storing the location of various reference points.

Session Area 190 can be in at least two different statuses: active status and passive status. When in active status, mobile equipment positioned within the zone will be able to log into or "check-in" the location based conditional networking session. Notification Area 185 is a zone, usually surrounding Session Area 190 (or extending Session Area 190) in which user equipment can be notified of many different occurrences such as that a conditional networking session is nearby, or active or is scheduled to turn active in a proximate future. Said notification activity can be regulated according to time windows and statuses. As non-limiting examples, notifications may occur only during day-time or only if the session event zone is scheduled to become active within forty eight hours or only until thirty minutes before the end of the active status time window.

FIG. 2 represents a datagram containing the conditions, parameters and data related to various events. In one implementation, a plurality of event organizers may populate Rows 230, 240, 250 and 260. Each of these rows represents an event. Column Event ID 208 stores the IDs associated with those events. IDs can be automatically generated by the system once an event is created or can be imported from a particular social network event database.

In one implementation, Event Planning Data Structure 200 can be not only represented on mobile equipment but also on a website on the Internet. Events, their session area, and their notification area can be graphically displayed to give a user a panoramic representation of the events that are active or that are scheduled in a certain area. Events can be filtered, searched and represented according to various parameters. A user might want only certain events to be displayed, e.g. only the events pertaining to selected groups or to groups that a user belongs to. Events can be filtered also according to temporal parameters, e.g. only events that will enter into an active status within a certain period or that are scheduled on a certain day of the week.

Column Organizers 209 includes the various event organizers. In Field 234 the organizer of an event is the owner of the commercial premises, for example the manager of a restaurant named "Cool River". In one possible implementation, this invention may help to fill windows of low activity for a commercial establishment and draw customers to the premises during those windows. For example, the owner of those premises may decide that organizing a recurrent meeting for one or more professional groups on a certain day of the week and in a certain time window may draw new customers or establish the place's reputation for attracting a certain kind of patrons, lawyers for example. In other cases, the organizer can be the administrator for a particular group in a social network. In Field 242 the organizer is, for example, the LinkedIn group administrator for the Real Estate Builders. He may decide that a meeting between his group and another LinkedIn group named Mortgage Bankers Association will be beneficial to both groups. The mixing of different groups with complementary interests is useful to the members of those groups. For example, instead of having a traditional networking sessions among people belonging to the same or homogeneous groups, groups can be paired so that there is a mutual interest in meeting members of the opposite group. The matching of groups having affinities in conjunction with a location based session event (characterized by a fixed location point representing a proxy for the venue of the event, a session area, and a time window) is not limited to two groups as described in Columns 210 and 211 of FIG. 2 but can be implemented for more than two groups. In Field 252, the organizer of the event is not the group administrator but a nonspecific member of one the groups.

In Field 261, the organizer of the event can be just an ordinary person who is not a member of any group associated with the event or the administrator of a group or the owner of any commercial premises positioned in Location 180. If certain settings in the system permit this option, individuals could take the initiative and organize events possibly with the consensus of all the parties involved such as the owner of the premises or groups administrators.

Columns 210 and 211 indicate predefined groups belonging to various social networks. As discussed, more than two columns are possible.

Column 212 defines the extension of Session Area 190 in case a circle is adopted as session area. In one implementation, Session Area 190 is the zone within which mobile equipment may be able to check-in. The Radius 182 of the session zone can be set as a function of the size of the venue that will host the event, or the expected attendance to the event, or the characteristics of the venue, or the precision of the locationing system employed by the user equipment to avoid the jittering and shifting of user equipment in and out of Session Area 190.

To avoid the problem, the system may use a timer so that only after a period has elapsed and user equipment steadily maintains its reported position in or out the session zone then the system may positively check-in or check-out said user equipment. The timer is especially useful when the check-in and check-out is automatic and does not involve user interaction.

Column 213 is one example defining the temporal and spatial extension of Notification Area 185 in the case its shape is circular. For example, Field 232 mandates that the notification may start three hours in advance of the starting of the event (i.e. when Session Zone will switch from a passive status to an active status) and will end one hour prior to the end of the event. The radius of the notification zone in Field 232 is set to be four miles and centered on the location of the event, i.e. Location 180.

Many different implementations are possible. As non-limiting examples a notification may occur: 1) only for users who have set the notification feature to be active; 2) only for members of groups associated with the event; 3) for anybody with the application running and located within Notification Area 185; 4) only for determined class of events. The notification may cease once a maximum number of check-ins has occurred. In another implementation, the notification may cease when a determined number of RSVPs ("Répondez S'il Vous Plaît") has occurred. In some implementations, Radius 181 may dynamically increase its size or the notifications become more inclusive (as to classes of users) if the number of check-ins or RSVPs is below a determined threshold at a predetermined moment in time T.

Column 214 contains time windows with data entries of when Session Zone 190 will be active. For the sake of simplification, in Column 214 only windows of "active status" are represented. Any time of the day when Session 190 is not active can be considered as "passive status". The person skilled in the art will understand that more than one window can occur and that other statuses other than "active" and "passive" can be implemented. For example, a status named "RSVP" can be implemented. Said RSVP status can be a time window preceding the active status consenting the booking of an active session place holder before the start of the active status. This is the equivalent of a waiting list when the number of possible users who are allowed to check-in is limited because, e.g., the premises do not permit more than a certain number of patrons. People already within Session Zone 190 may be allowed to RSVP and reserve a spot. In some other implementation, Time Window 214 may dynamically adjust according to various thresholds. For example, if the event has reached a maximum number of check-ins, the event window can be extended by the system. If the level of meeting requests among members who are in the active session is above a certain threshold toward the end of the active session period, then the system may automatically extend the time window. Alternatively, an event organizer can also extend it manually.

Column 215 contains fields related to the recurrence of a certain event. Sometimes, as described in Field 243, the event is a single event without any recurrence.

Column 216 contains examples of parameters and conditions that may regulate an event. For example, in Field 231 a maximum number of check-ins is set. Once said maximum number is reached, the system may not allow any more check-ins. It may also warn users within the Notification Area 185 that the event has reached its maximum capacity. An RSVP function may help to regulate the event and set aside check-in capability for those users who meet certain criteria.

Events can also be open or closed to members not belonging to the groups that are in Columns 210 and 211. This means that notifications or the capability to check-in can be restricted by the systems settings if the user is not a member of the groups as described, for example, in Filed 241.

In some implementations, it can be beneficial to have a determined predefined mix of members of the groups rather than leave it to chance. In Field 251, for example, the event organizer may set a desired mix of group members who should attend. The system may regulate notifications and check-ins in a manner to favor the participation of one category of group members over another category to optimize the desired ratio. In addition, the system may halt notifications, check-ins or RSVPs of members of one group if a clear imbalance (either in numerical terms or as a percentage) is perceived by the system as represented in Field 262. The system may also reach out to members of the underrepresented group with proposals and offers to entice them to join the event and achieve the desired ratio among different group members.

Column 217 contains the data relevant to Location 180. Said data can be in the form of an address, latitude and longitude or a public commercial venue as non-limiting examples.

Figure 3:
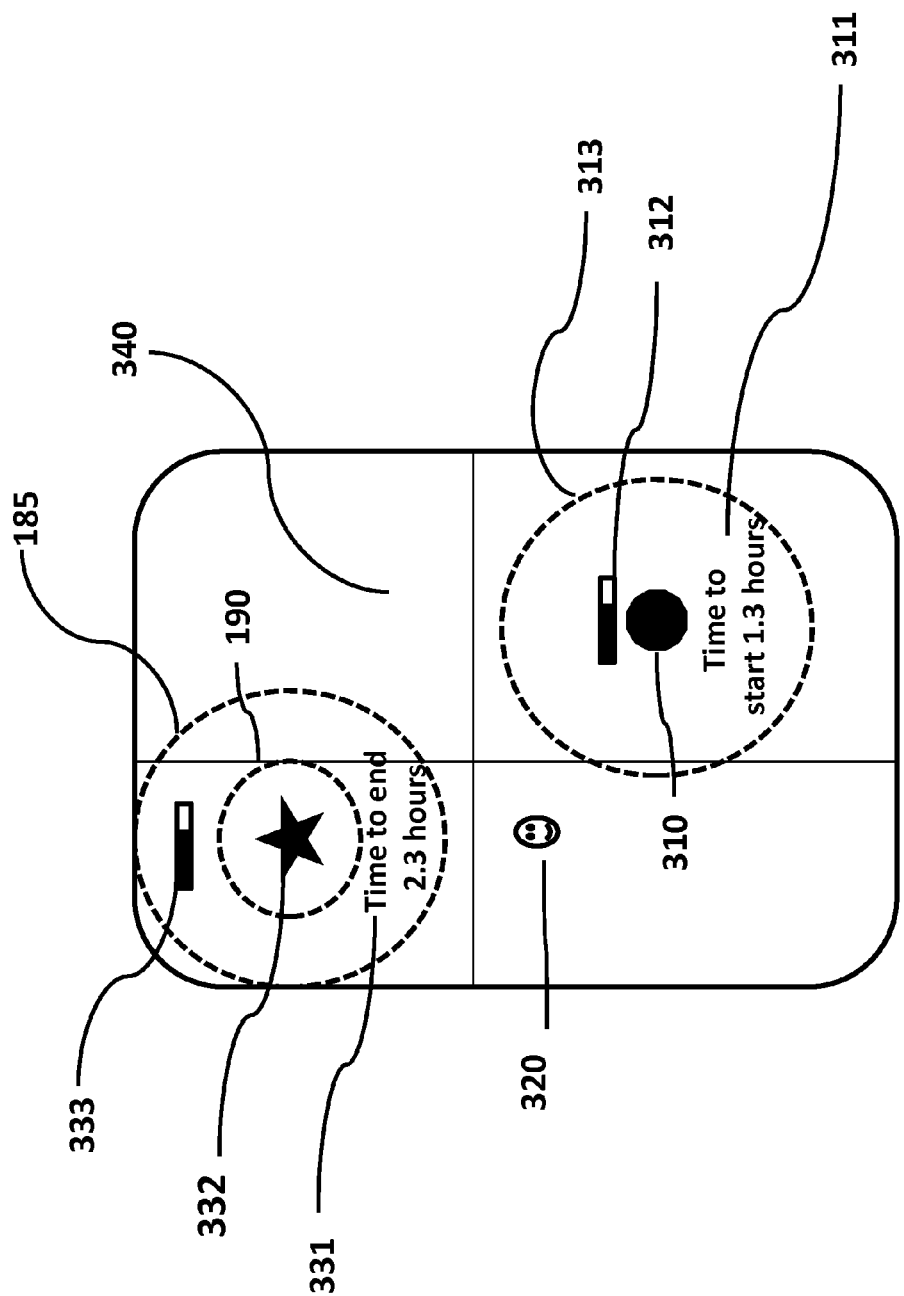
FIG. 3 is a non-limiting example of user equipment's screen shot (I/O User Interface status). The person skilled in the art will recognize that, as technology advances, similar information can be conveyed by different means, e.g. via an augmented reality equipment or can be displayed on surfaces by a projector module, so that a traditional screen may not be necessary.

FIG. 3 represents an example of one implementation of visual indicia that a user apparatus, such as for example User Equipment 165, 160 or 170 may convey to a user. Screen 340 represents a map of the places nearby said user equipment apparatus.

Icon 320 represents the location of said user equipment on the map. In some implementations, it can be placed in the center of the screen as a default.

Event 310 represents an event that has not started yet. The passive status can be indicated by means of a particular shape or alternatively by a particular color, yellow for example. Notification 311 indicates the time left for the event to initiate. In this case, 1.3 hours is the period before the starting of the event. Bar Notification 312 may indicate the level of RSVPs that has been reached at a certain moment in time versus the number of RSVPs or check-ins that is reserved for the event. For example, the bar may fill up more and more to indicate a higher number of responses. Circle 313 is a visual representation of the notification area that may or may not be implemented.

Event 332 is an event that is in active status and therefore it is possible to check-in if user equipment enters the session zone that is graphically represented by Session Area 190. The active status can be represented by the shape of an icon or by a particular color, green for example. Notification 331 indicates the time remaining before the event ends. Bar Notification 333 may indicate the level of check-ins that has been reached at a certain moment in time versus the number of check-ins that was reserved for the event. Notification Area 185 represents the area wherein nearby users can be alerted about the event.

Figure 4:
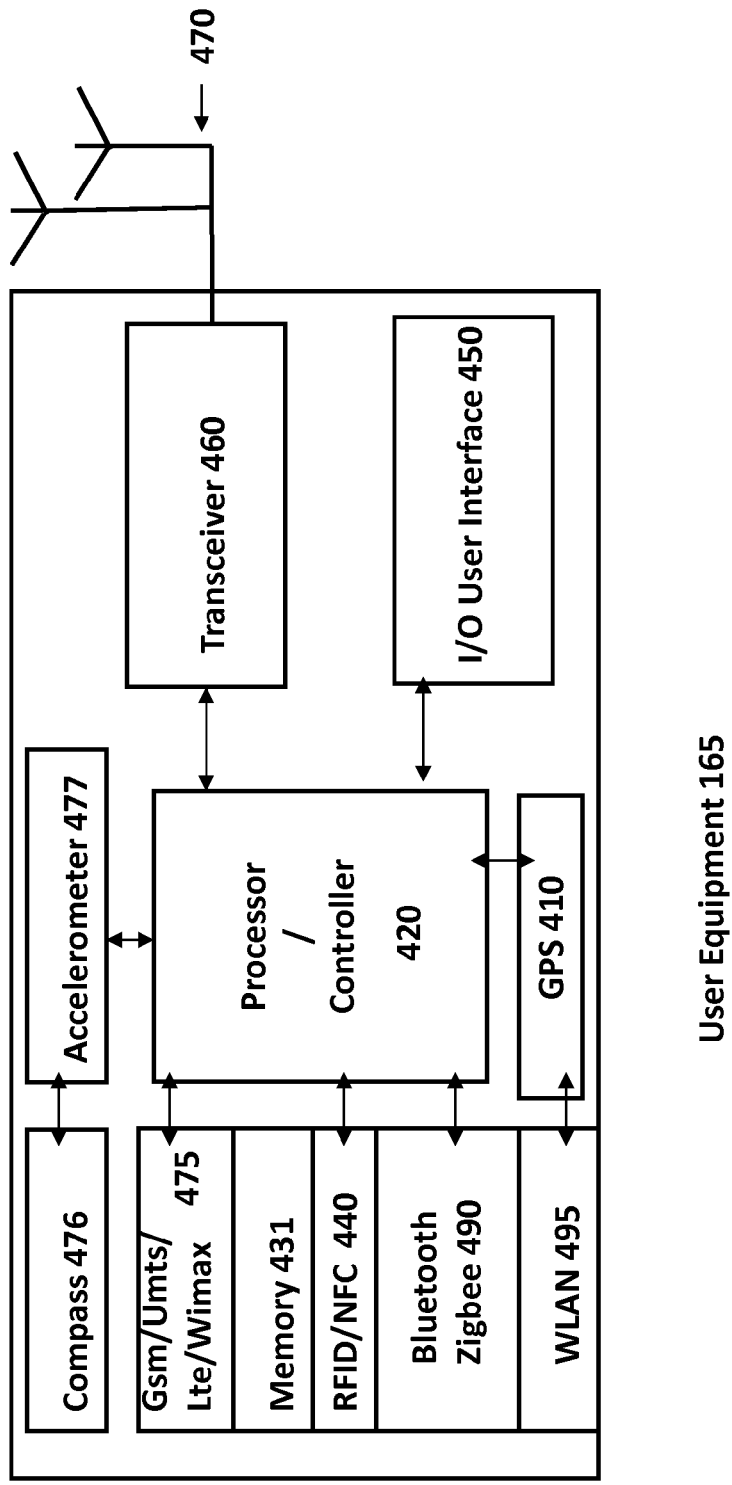
FIG. 4 represents a schematic representation of an embodiment of user equipment such as User Equipment 160, 165 or 170. It may also represent a schematic representation of an Organizer Equipment 110 in some implementations.

FIG. 4 provides a schematic example of a User Equipment 165 apparatus in accordance with an embodiment of the present invention. In a possible implementation, User Equipment 165 can be substantially similar to User Equipment 160 and User equipment 170 and the generic description of User Equipment 165 can be applicable. In addition, Organizer Equipment 110 can also be mobile equipment and the same description may also apply.

The person skilled in the art will recognize that by virtue of a possible log in mechanism, users may use various equipment as long as said equipment is running a software application contained, e.g., in Memories 430, 431 and 432 and enabling the functionalities described in this application. In practice, the using of a login and a password to access and run a software application stored on equipment makes said equipment interchangeable.

User Equipment 165 is a general example of a mobile device that users can operate. It could be a traditional mobile phone, a personal digital assistant, a laptop computer, an e-book reader, an entertainment console or controller, wearable hardware such as augmented reality headsets, a tablet computer or any other equivalent portable device that may be used to communicate with other mobile equipment or with Server 100. Organizer Equipment 110 can instead be portable or fixed. User Equipment 165 includes at least one Processor 420 and at least a Memory 430 comprising computer program instructions. The at least one Processor 420/Controller can be embodied by any computational or data processing device, such as a central processing unit (CPU) or application specific integrated circuit (ASIC). The at least one Processor/Controller 420 can be implemented as one or a plurality of controllers.

Memory 430 may contain application software running on User Equipment 165. Memory 430 may also contain at least portions of Event Planning data Structure 200 that are most relevant to the location, period of time and user ID profile associated with said User Equipment 165 at a certain moment in time. The at least one Memory 430 can be any suitable storage device, such as a non-transitory computer-readable medium. For example, a hard disk drive (HDD) or random access memory (RAM) can be used in the at least one Memory 430. The at least one Memory 430 can be on the same chip as the at least one Processor/Controller 420, or may be separate from the at least one Processor 420. The computer program instructions may be any suitable form of computer program code. For example, the computer program instructions may be a compiled or interpreted computer program. The at least one Memory 430 and computer program instructions can be configured to, with the at least one Processor 420, to cause a hardware apparatus (for example, User Equipment 165) to perform any process described herein.

User Equipment 165 may include a Radio Frequency Identification (RFID) and/or a Near Field Communication (NFC) Module 440 with an antenna (not shown). The RFID/NFC Module 440 may operate using traditional RFID frequencies or NFC frequencies. In one implementation these RFID/NFC Modules 440 contained in User Equipment 165 may send a wireless digital identifier (ID) associated with a user to an RFID reader located in the premises of Location 180, a bar for example.

An algorithm located on Server 100 may automatically check-in User Equipment 165 that is associated with said wireless digital identifier (ID). An algorithm residing on Server 100 can also associate these IDs to the data structures described in FIG. 2.

A check-in made by means of an RF-ID reader (or tags) can also be used in combination with Compass 476 and Accelerometer 477 to provide an accurate tracking of the position of users via inertial measurements within enclosed premises where a GPS module or other locationing systems may not work or be sufficiently precise.

For example, if the range of the RF-ID reader is short (e.g. 2 feet) the system will use the position of the RF-ID reader as the position at the time T of check-in. The system may also use Accelerometer 477 and Compass 476 to track and record any subsequent movement of User Equipment 165 for at least the duration of the active session. In so doing, the system may have a sufficiently precise position of particular user equipment in time. The event location may have more than one RF-ID readers inside the event area so that positions of users can be updated and refined every time that user equipment passes nearby one of these RF-ID readers.

A precise indoor positioning system and Compass 476 can be used to implement a function that can be desirable in crowded venues. For example, when a user requests a meeting with another user within Session Area 190 and said meeting request is accepted, it is desirable that I/O User Interface 450 produce an indication of where the other user is located. If the location of the two users is known with a good level of precision by the system or by a software module running on Memory 431, I/O User interface 450 may produce indicia such as an arrow pointing at the location of the user to be met and a distance value. Said functionality can be implemented at least in part by hardware components and software routines located either on User Equipment 165 or on Server 100.

Alternatively, the system might have predefined indoor or outdoor meeting locations memorized and stored either on Memory 102 or on Memory 431. Users can be routed to those locations to meet for face to face gathering by the algorithm in a round robin fashion to try to avoid congestion.

User Equipment 165 may also include an I/O User Interface 450. I/O User Interface 450 may allow inputting information via a touch screen or a QWERTY keyboard.

I/O User Interface 450 may also include a vibrating notification module, a speaker or a monitor or any combination thereof. User Equipment 165 may include one or more Transceiver 460 configured to operate in conjunction with one or more Antenna 470 to communicate wirelessly. In one embodiment, the Antenna Unit 470 may support beam forming and/or multiple input multiple output (MIMO) operations. As is known to those skilled in the art, MIMO operations may provide spatial diversity, which is to overcome difficult channel conditions and/or increase channel throughput. The Antenna 470 may include antenna tuning and/or impedance matching components, RF power amplifiers, and/or low noise amplifiers. User Equipment 165 can be optimized to support multiple transceivers using multiple wireless standards.

In one example embodiment, User Equipment 165 may support simultaneous transmission of cellular (for example, GSM/UMTS/LTE/WiMAX) and non-cellular (for example, WLAN 495 or Bluetooth®/ZigBee 490) radio carriers. A Transmission Module GSM/UMTS/LTE/WiMAX 475 could be the medium by which User Equipment 165 communicates with Server 100.

The locationing component of the invention can be advantageously implemented in many different ways. In one possible implementation, a GPS Module 410 may provide the location of User Equipment 165 to Server 100 via Data Link 141. When in closed environments, such as a shopping mall, the location data can be provided via different techniques. For example, choke points or grids, location indexing and presence reporting for tagged objects (such as RF_ID readers), can be used to provide location data when indoor. Other examples of techniques used to provide location are angle of arrival, time of arrival and received signal strength indication.

Figure 5:
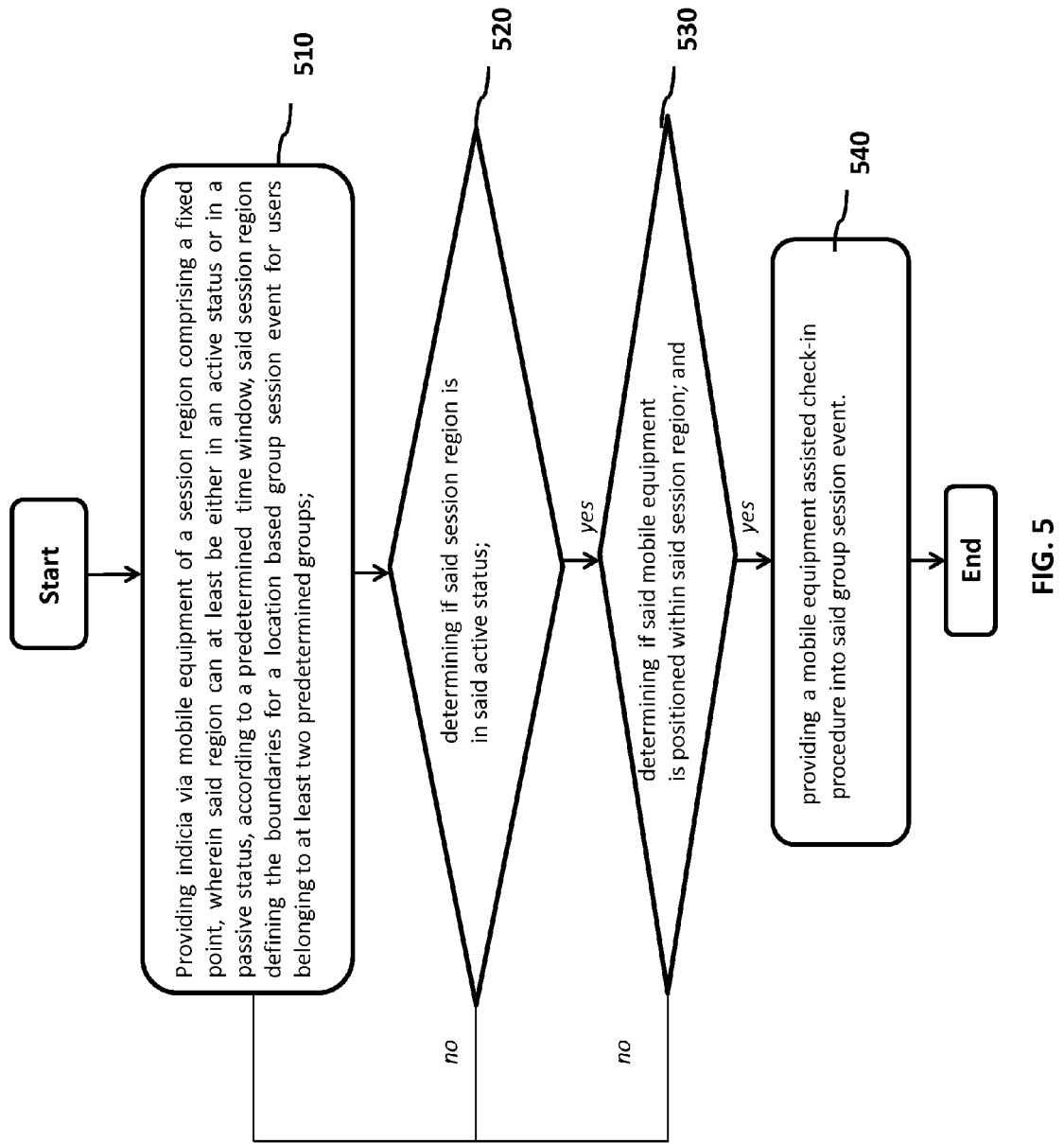
FIG. 5 represents a possible method embodiment of the invention.

FIG. 5 represents one possible method embodiment of the present invention focusing on the aspect and feature of creating events for multiple groups having a vested interest in the interaction with each other. Said groups are named "complementary" groups in this patent application. Non-limiting examples of said complementary groups are given in FIG. 2, Columns 210 and 211. For example, the professional category of IP Lawyers can be paired with the professional category of entrepreneurs as in Row 230. Complementary groups are not limited to groups that have an economical interest in networking among each other but also encompass any matching, social and cultural interest. For example, the present invention can be used as a dating tool. The group "Single moms of Dallas" can be paired to the group "Divorced fathers of Dallas."

The method comprises:

1) providing indicia via a mobile equipment of a session region comprising a fixed point, wherein said region can be at least either in an active status or in a passive status according to a predetermined time window, said session region defining the boundaries for a location based group session event for users belonging to at least two predetermined groups; (510)

2) determining if said session region is in said active status; (520)

3) determining if said mobile equipment is positioned within said session region; (530) and 4) providing a mobile equipment assisted check-in procedure into said group session event. (540).

The person skilled in the art will understand that the order of the above-mentioned steps can vary without departing from the scope of the invention.

Figure 6:
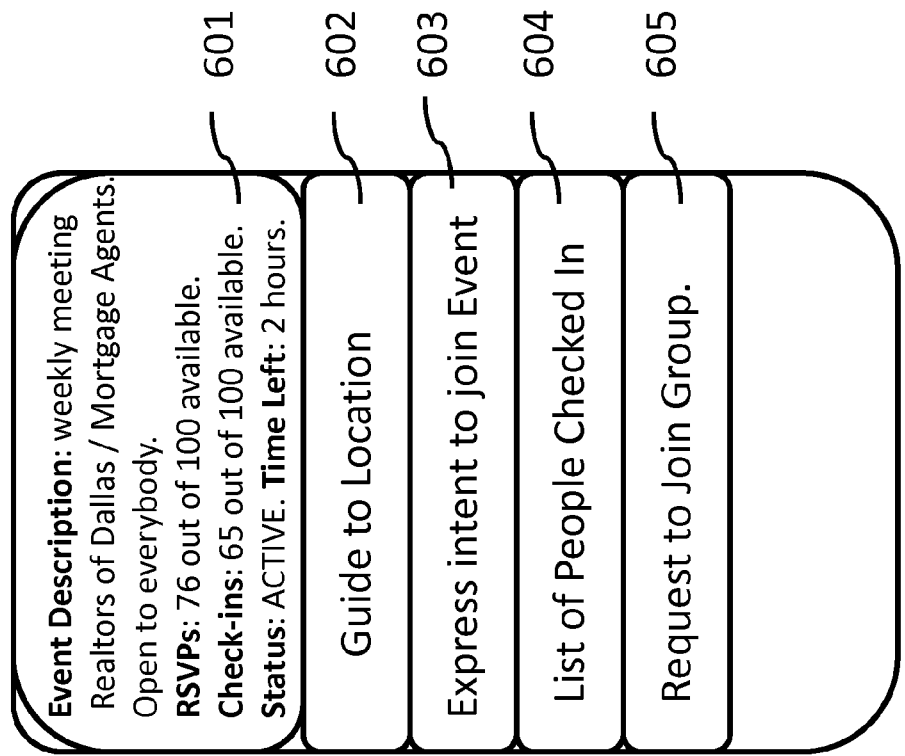
FIG. 6 is another non-limiting example of a user equipment's I/O User Interface status.

FIG. 6 represents an illustration of a possible implementation for a user interface screen that a user apparatus such as User Apparatus 170 may display to a user, e.g., after having received an alert that an event is nearby because User Apparatus 170 is located within Notification Area 185.

Screen 601 may provide indications about the nature of the event. For example, in this case there is an "ACTIVE" weekly meeting between "Realtors of Dallas" and "Mortgage Agents".

In this example, the system settings indicate that the event is open to anybody interested so anybody may check-in if within Session Area 190 and anybody can be notified if located within Notification Area 185. The meeting has received 76 RSVPs out of 100 available. The meeting has received 65 check-ins out of 100 available. The status of the meeting is ACTIVE, i.e. Session Area 190 is in the active status and the check-in procedure is possible. The time left for the event session is 2 hours.

Button 602, if activated, may open a new screen with indications and routing to enter Session Area 190 or reach Location 180.

Button 603 if activated may send a signal to Server 100 to indicate user's intention (RSVP) to join the event in Location 180. The sending of the RSVP signal may reserve a spot in the number of available check-ins if, e.g., the check-in occurs within a determined time window. RSVPs can be canceled if the actual check-in does not occur within a determined time window.

Button 604, if activated, may open a new screen wherein a list of users who have checked-in is displayed. Said functionality can be limited or regulated according to various settings including privacy settings. It can be restricted to members the groups who are hosting the event. It can be restricted to members who have already checked-in, namely only if a user has checked-in he may be able to see other checked-in users. It can also be restricted to members having special privileges.

Button 605, if activated, may send to Sever 100 a request to join as a member of a group related to the event occurring or scheduled to occur at an event Location 180.

Figure 7:
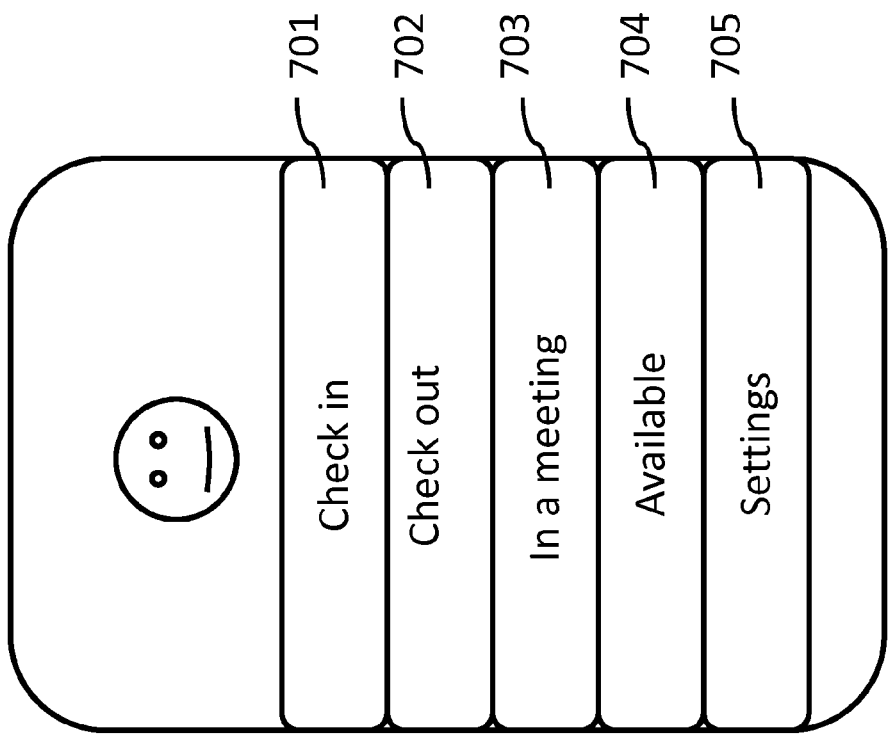
FIG. 7 is another non-limiting example of a user equipment's I/O User Interface status.

FIG. 7 represents an illustration of a possible implementation for a user interface screen that a User Apparatus 165 may display to a user. In some implementations, the screen may be accessible only if the system or User Apparatus 165 determines that its location is within Session Area 190.

Button 701, in some implementations, is active only within Session Area 190. If Button 701 is activated it may cause User Apparatus 165 to join the location based group session event. In some implementations, the check-ins and check-outs may occur automatically once User Apparatus 165 enters or exits Session Area 190 according to various settings.

Button 702, if activated, may cause User Apparatus 165 to leave the location based group session event, i.e. check-out.

Button 703 and Button 704, if activated, may cause User Apparatus 165 to display a notification to other user apparatuses that user of User Apparatus 165 is either currently interacting with another user (and that requests for meetings are not possible at that time) or that user of User Apparatus 165 is available for possible face-to-face interactions.

Button 705 may open a settings screen wherein a user may fine-tune some preferences during a location based group session. In addition, as discussed, a user may want to make the check-ins and the check-outs automatic upon entering Session Area 190 if, e.g., he or she is a member of at least one of the groups associated with the location based group session.

In one implementation, user may decide to be visible only to certain group members while remain invisible to others. User may decide to be visible only to members of a complementary group to pursue business opportunities. User may also decide to be visible only to second or third degree connections and interact with people who are not first-degree connections to enlarge the boundaries of his network.

Figure 8:
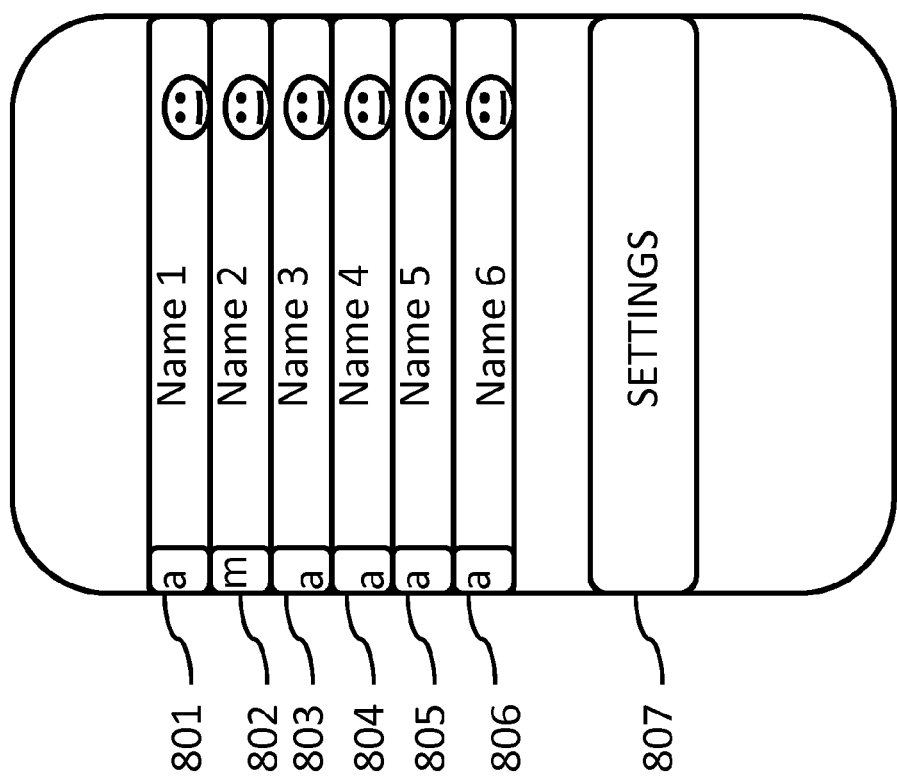
FIG. 8 is another non-limiting example of a user equipment's I/O User Interface status.

FIG. 8 represents an illustration of a possible implementation for a user interface screen that a User Apparatus 165 may display to a user, e.g., after having checked-in within Session Area 190. Information 801 is an example of a line representing another user who has checked-in within Session Area 190. A row with a first name and last name can be a hyperlink to a LinkedIn profile of said another user. A picture of said another user can also be displayed. The "a" paired with "Name 1" may indicate that said user is "available" for a possible face-to-face meeting.

Information 802 is an example of a line representing a user who has checked-in within Session Area 190. The "m" paired with "Name 2" may display that said user is not available for a possible face-to-face meeting because he is currently in a "meeting".

Information 801 though 806 can be arranged in many possible ways according to Settings 807. User may want to filter or arrange users who have checked-in many different ways. For example, user may want to display first users who belong to a particular group. User may want to display first users who have checked-in more recently or who have been in the group session the longest.

Figure 9:
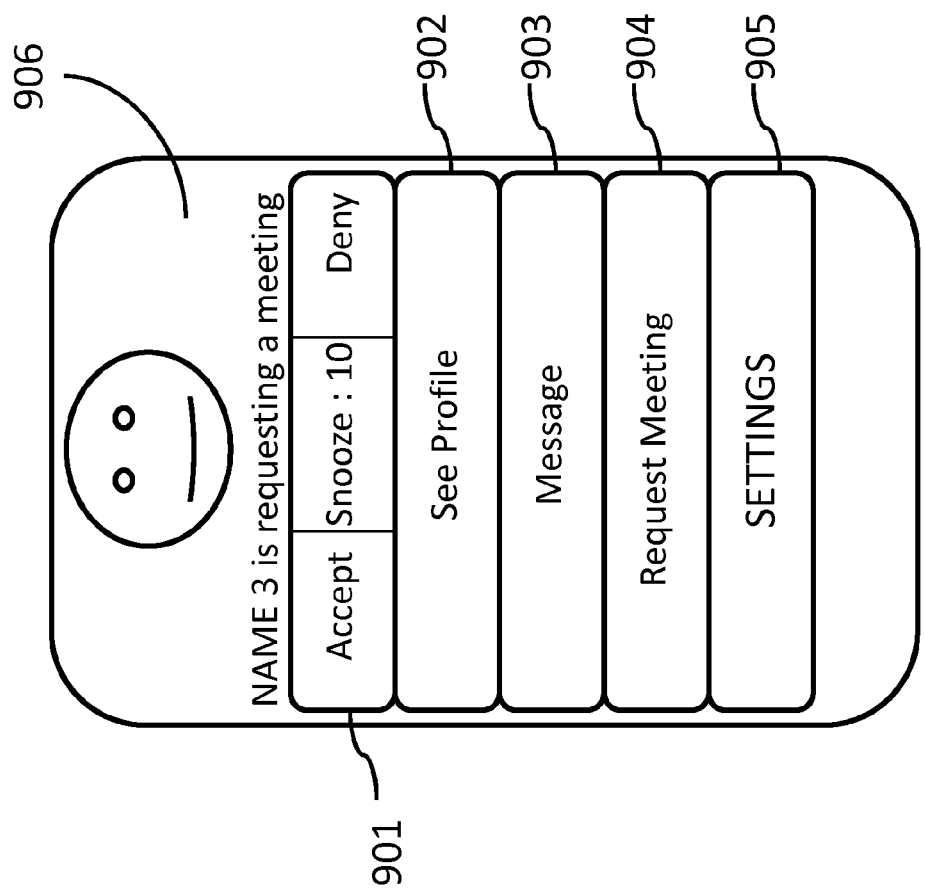
FIG. 9 is another non-limiting example of a user equipment's I/O User Interface status.

FIG. 9 represents an illustration of a possible implementation for a user interface screen that a User Apparatus 165 may automatically display to a user, e.g., after having received a meeting request from another user who is checked-in into Session Area 190. The same screen may also appear after user selects, for example, the line Information 801 in FIG. 8.

Screen 906 may display output information associated with users who have checked-in or notifications and alerts. In this case, the notification is about a meeting request from "Name 3". A picture of Name 3 may be displayed to facilitate the identification of Name 3 in the location wherein the active session is occurring.

Multifunctional Button 901 may provide input capabilities associated with meeting requests. Upon request of a meeting, user of User Apparatus 165 may choose to accept the invite or snooze it ("snooze: 10") communicating, for example, a delay of ten minutes to the party requesting the meeting. User of User Apparatus 165 may also communicate its unavailability to the meeting request, ("deny").

Button 902 may link to a profile (or part of it) associated with the particular user. The profile can be pulled from a social network associated with the application's account, e.g. LinkedIn, Facebook or retrieved from an ad hoc server storing said profiles such as Server 100.

Button 903 may open an instant messaging session with a particular user.

Button 904 can be used to request a meeting with a particular user who has checked-in the active session. Said button may trigger a default alert on said particular user's user apparatus. Meeting place and other indications can also be automatically handled by algorithms stored on Memory 102.

Settings 905 may provide many possible alternatives on how users who have checked-in are displayed. In addition, for example, user of User Equipment 165 may decide to become invisible to certain users or class of users or put specific users on a no-contact list.

A technical effect of one or more of the example embodiments disclosed herein is that indoor positioning, especially in large venues, may become more and more popular and software can be developed so that users will be able to meet and interact in crowded venues.

Embodiments of the present invention may be implemented in software, hardware, application logic or a combination of software, hardware and application logic. The software, application logic and/or hardware may reside on mobile computer equipment, fixed equipment or servers that may not always be owned or operated by a single entity. If desired, part of the software, application logic and/or hardware may reside on multiple servers and equipment in charge of different processes.

In an example embodiment, the application logic, software or an instruction set is maintained on any one of various conventional computer-readable media. In the context of this application, a "computer-readable medium" may be any media or means that can contain, store, communicate, propagate or transport the instructions for use by or in connection with an instruction execution system, apparatus, or device, such as a computer, with one example of computers described and depicted in FIG. 1 (100, 110, 160, 165 and 160). A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or can be combined. As technology advances, new equipment and techniques can be viable substitutes of the equipment and techniques that have been described in this application.

Although various aspects of the invention are set out in the independent claims, other aspects of the invention comprise other combinations of features from the described embodiments and/or the dependent claims with the features of the independent claims, and not solely the combinations explicitly set out in the claims. The above described example embodiments of the invention should not be viewed as limiting but merely as explanatory. There are several variations and modifications, which may be made without departing from the scope of the present invention as, defined in the appended claims.

What is claimed is:

1. A method for facilitating networking among members of a social network, comprising:
    causing, at least in part, visual indicia of a session area that is anchored to a fixed point, wherein said session area is, at least during a time window, in an active status and, while in said active status, said session area is joined by said members of said social network by means of mobile equipment associated with said members, when said mobile equipment is determined to be positioned within boundaries associated with said session area via at least one positioning related technology selected from the group consisting of: satellite positioning technology, geo-fencing technology, radio horizon measurements technology, triangulation technology, cell ID reporting technology, WLAN cell ID identification technology, Bluetooth cell ID identification technology, RF-ID cell identification technology, RF-ID tagging technology, inertial positioning technology, time of arrival measurements technology, received signal strength measurements technology, angle of arrival measurements technology, choke points technology, location indexing technology, presence reporting technology and combinations thereof;
    regulating, at least in part, the joining of said session area by members of at least a first group in said social network, wherein said first group is characterized by at least a first set of attributes;
    regulating, at least in part, the joining of said session area by members of at least a second group in said social network, wherein said second group is characterized by at least a second set of attributes and pairing of said first set of attributes with said second set of attributes to form a predetermined complementary set of attributes that is associated to said session area;
    attaining, at least in part, a predetermined mix of members of said first group and members of said second group joining said session area during said active status by selectively providing visual indicia associated with said session area to said members of said social network selected from the group consisting of: said members of said first group, said members of said second group, and combinations thereof; and
    providing, at least in part, a networking related functionality to at least some of said members of at least said first group that have joined said session area during said active status and to at least some of said members of said at least second group that have joined said session area during said active status.

2. The method of claim 1, further comprising: restricting the visibility of at least some members of said at least second group in said social network to at least some members of said at least first group in said social network.

3. The method of claim 1, wherein said active status is recurrent during predetermined time windows.

4. The method of claim 1, further comprising: facilitating attainment of a predefined numerical proportion between said members of said at least first group in said social network and said members of said at least second group in said social network via functionalities associated with said session area selected from the group consisting of: a notification functionality, a reservation functionality, a restricted permission to join functionality, and combinations thereof.

5. The method of claim 1, further comprising: providing a reservation functionality, wherein said members of said at least first group in said social network can reserve, before the occurrence of a time window associated with said session area, a right to join said session area.

6. The method of claim 1, further comprising:
    providing a notification functionality that is regulated according to data selected from the group consisting of: data representative of a number of members of said at least first group in said social network who joined said session area at a point in time, data representative of a number of members of said at least first group in said social network who reserved a right to join said session area via a reservation functionality at a point in time, and combinations thereof.

7. At least one non-transitory computer-readable medium having a set of instructions for controlling at least one general-purpose digital computer in performing desired functions comprising a set of instructions formed into each of a plurality of modules, said modules comprising:
    a process for causing, at least in part, visual indicia of a session area that is anchored to a fixed point, wherein said session area is; at least during a time window, in an active status and, while in said active status, said session area is joined by said members of said social network by means of mobile equipment associated with said members, when said mobile equipment is determined to be positioned within boundaries associated with said session area via at least one positioning related technology selected from the group consisting of: satellite positioning technology, geo-fencing technology, radio horizon measurements technology, triangulation technology, cell ID reporting technology, WLAN cell ID identification technology, Bluetooth cell ID identification technology, RF-ID cell identification technology, RF-ID tagging technology, inertial positioning technology, time of arrival measurements technology, received signal strength measurements technology, angle of arrival measurements technology, choke points technology, location indexing technology, presence reporting technology and combinations thereof;
    a process for regulating, at least in part, the joining of said session area by members of at least a first group in said social network, wherein said first group is characterized by at least a first set of attributes;

a process for regulating, at least in part, said joining of said session area by members of at least a second group in said social network, wherein said second group is characterized by at least a second set of attributes, wherein pairing of said first set of attributes with said second set of attributes forms a predetermined complementary set of attributes that is associated to said session area;

a process for causing, at least in part, visual indicia associated with said session area to said members of said social network selected from the group consisting of: said members of said first group, said members of said second group, and combinations thereof; such that a predetermined mix of members of said first group and members of said second group joining said session area during said active status is attained;

a process for enabling, at least in part, a networking related functionality for at least some of said members of at least said first group that have joined said session area during said active status and for at least some of said members of said at least second group that have joined said session area during said active status.

8. The non-transitory computer-readable medium of claim 7, said modules further comprising:

a process for restricting the visibility of at least some members of said at least second group in said social network to at least some members of said at least first group in said social network.

9. The non-transitory computer-readable medium of claim 7, wherein said active status occurs during predetermined time windows.

10. The non-transitory computer-readable medium of claim 7, said modules further comprising:

a process for facilitating attainment of a predefined numerical proportion between said members of said at least first group in said social network and said members of said at least second group in said social network via functionalities associated with said session area and selected from the group consisting of: a notification functionality, a reservation functionality, a restricted permission to join functionality, and combinations thereof.

11. The non-transitory computer-readable medium of claim 7, said modules further comprising:

a process for providing a reservation functionality wherein said members of said at least first group in said social network can reserve, before the occurrence of a time window associated with said session area, a right to join said session area.

12. The non-transitory computer-readable medium of claim 7, said modules further comprising:

a process for regulating a notification functionality, at least in part, according to data selected from the group consisting of: data representative of a number of members of said, at least first group in said social network who joined said session area at a point in time, data representative of the number of members of said at least first group in said social network who reserved a right to join said session area via a reservation functionality at a point in time, and combinations thereof.

13. The non-transitory computer-readable medium of claim 7, said modules further comprising:

a process for creating a log of indicia of at least a subset of members of said social network who joined said session area during a predetermined time window.

14. An apparatus, comprising:

at least one processor; and at least one non-transitory computer-readable medium including a computer program code; the at least one non-transitory computer-readable medium and the computer program code configured to, with the at least one processor, cause the apparatus to perform at least the following:

causing, at least in part, indicia of a session area that is anchored to a fixed point, wherein said session area is; at least during a time window, in an active status and, while in said active status, said session area is joined by said members of said social network by means of mobile equipment associated with said members, when said mobile equipment is determined to be positioned within boundaries associated with said session area via at least one positioning related technology selected from the group consisting of: satellite positioning technology, geo-fencing technology, radio horizon measurements technology, triangulation technology, cell ID reporting technology, WLAN cell ID identification technology, Bluetooth cell ID identification technology, RF-ID cell identification technology, RF-ID tagging technology, inertial positioning technology, time of arrival measurements technology, received signal strength measurements technology, angle of arrival measurements technology, choke points technology, location indexing technology, presence reporting technology and combinations thereof;

enabling, at least in part, the joining of said session area by members of at least a first group in said social network, wherein said first group is characterized by at least a first set of attributes;

enabling at least in part, said joining of said session area by members of at least a second group in said social network, wherein said second group is characterized by at least a second set of attributes and pairing of said first set of attributes with said second set of attributes forms a predetermined complementary set of attributes that is associated, at least temporarily, to said session area;

providing, at least in part, indicia associated with said session area to said members of said social network selected from the group consisting of: said members of said first group, said members of said second group, and combinations thereof, whereby a predetermined mix of members of said first group and members of said second group joining said session area during said active status is attained; and enabling, at least in part, a networking functionality between at least some of said members of at least said first group that have joined said session area during said active status and at least some of said members of said at least second group that have joined said session area during said active status.

15. The apparatus of claim 14, further comprising:

said at least one processor; and said at least one non-transitory computer-readable medium including computer program code; the said at least one non-transitory computer-readable medium and said computer program code configured to, with said at least one processor, cause the apparatus to additionally perform at least the following:

restricting the visibility of at least some members of said at least second group in said social network to at least some members of said at least first group in said social network.

16. The apparatus of claim 14, wherein said active status occurs during a predetermined time window.

17. The apparatus of claim 14, further comprising:
said at least one processor; and said at least one non-transitory computer-readable medium including computer program code; the said at least one non-transitory computer-readable medium and said computer program code configured to, with said at least one processor, cause the apparatus to additionally perform at least the following:
facilitating attainment of a predefined numerical proportion between said members of said at least first group in said social network and said members of said at least second group in said social network via functionalities associated with said session area selected from the group consisting of: a notification functionality, a reservation functionality, a restricted permission to join functionality, and combinations thereof.

18. The apparatus of claim 14, further comprising:
said at least one processor; and said at least one non-transitory computer-readable medium including computer program code; the said at least one non-transitory computer-readable medium and said computer program code configured to, with said at least one processor, cause the apparatus to additionally perform at least the following:
implementing a reservation functionality wherein said members of said first group in said social network can reserve, before the occurrence of a time window associated with said session area, a right to said joining of said session area, and thus said right to said joining of said session area is regulated.

19. The apparatus of claim 14, further comprising:
said at least one processor; and said at least one non-transitory computer-readable medium including computer program code; the said at least one non-transitory computer-readable medium and said computer program code configured to, with said at least one processor, cause the apparatus to additionally perform at least the following:
providing a notification functionality that is regulated, at least in part, according to data selected from the group consisting of: data representative of the number of members of said at least first group in said social network who joined said session area at a point in time, data representative of the number of members of said at least first group in said social network who reserved a right to join said session area via a reservation functionality at a point in time, and combinations thereof.

20. The apparatus of claim 14, further comprising:
said at least one processor; and said at least one non-transitory computer-readable medium including computer program code said at least one non-transitory computer-readable medium and said computer program code configured to, with said at least one processor, cause the apparatus to additionally perform at least the following:
facilitating the creation of a log of indicia of at least a subset of members of said social network who joined said session area.

\* \* \* \* \*